US010011283B2

(12) United States Patent
Pursifull et al.

(10) Patent No.: US 10,011,283 B2
(45) Date of Patent: Jul. 3, 2018

(54) SYSTEM AND METHOD FOR DRIVING VEHICLE ACCESSORIES

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US); Michael E. Reibling, Sterling Heights, MI (US); Steven Michael Cyr, Lake Orion, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 15/195,725

(22) Filed: Jun. 28, 2016

(65) Prior Publication Data
US 2017/0369066 A1    Dec. 28, 2017

(51) Int. Cl.
*B60W 30/188*    (2012.01)
*B60W 10/30*    (2006.01)
*F16H 61/14*    (2006.01)
*B60W 10/02*    (2006.01)
*B60W 10/06*    (2006.01)

(52) U.S. Cl.
CPC ...... *B60W 30/1888* (2013.01); *B60W 10/023* (2013.01); *B60W 10/06* (2013.01); *B60W 10/30* (2013.01); *B60W 2510/1005* (2013.01); *B60W 2520/10* (2013.01); *B60W 2710/021* (2013.01); *B60W 2710/027* (2013.01); *B60W 2710/0616* (2013.01); *B60W 2710/0644* (2013.01)

(58) Field of Classification Search
CPC .......... B60W 30/1888; B60W 10/023; B60W 10/06; B60W 10/30; B60W 10/02; B60W 10/08; B60W 2510/1005; B60W 2520/10; B60W 2710/021; B60W 2710/027; B60W 2710/0616; B60W 2710/0644; F16H 61/143; F16H 61/14
USPC .......... 477/5; 701/36, 22; 903/902; 123/294; 180/65.28
See application file for complete search history.

(56) References Cited

U.S. PATENT DOCUMENTS 5,002,170 A    3/1991    Parsons et al.
5,035,308 A    7/1991    Baba et al.
(Continued)

FOREIGN PATENT DOCUMENTS

EP    1160119 A1    5/2001
EP    2055558 A2    10/2008
WO    8501779    4/1985

OTHER PUBLICATIONS

Cunningham, Ralph Wayne, et al., "Methods and System for Decelerating a Vehicle," U.S. Appl. No. 15/170,014, filed Jun. 1, 2016, 39 pages.

(Continued)

*Primary Examiner* — Krishnan Ramesh
(74) *Attorney, Agent, or Firm* — Julia Voutyras; McCoy Russell LLP

(57) ABSTRACT

Methods and systems for driving vehicle accessories of a vehicle that includes an automatic transmission are presented. In one non-limiting example, the vehicle accessories are driven via a vehicle's kinetic energy while an engine of the vehicle has stopped rotating. Vehicle accessories are driven from a location of a driveline downstream of a torque converter impeller.

19 Claims, 5 Drawing Sheets

(56) References Cited

U.S. PATENT DOCUMENTS

| | | | |
|---|---|---|---|
| 5,133,232 A | 7/1992 | Kikuchi et al. | |
| 5,211,270 A | 5/1993 | Tamura et al. | |
| 5,314,050 A | 5/1994 | Slicker et al. | |
| 5,329,770 A | 7/1994 | Ward | |
| 5,795,262 A | 8/1998 | Robinson | |
| 6,042,507 A | 3/2000 | Genise et al. | |
| 7,769,517 B2 | 8/2010 | Segawa et al. | |
| 8,131,430 B2 | 3/2012 | Lecointre et al. | |
| 8,374,759 B2 | 2/2013 | Arlauskas et al. | |
| 8,401,768 B2 | 3/2013 | Lewis et al. | |
| 9,002,600 B2 | 4/2015 | Gibson et al. | |
| 2006/0111220 A1 | 5/2006 | Ogawa et al. | |
| 2008/0172161 A1 | 7/2008 | Kondo et al. | |
| 2011/0039657 A1 | 2/2011 | Gibson et al. | |
| 2012/0065022 A1* | 3/2012 | Ohashi | B60W 10/023 477/77 |
| 2012/0258838 A1* | 10/2012 | Hartz | B60K 6/40 477/5 |
| 2013/0023379 A1* | 1/2013 | Bucknor | B60K 6/48 477/5 |
| 2013/0234164 A1 | 9/2013 | Nagasawa et al. | |
| 2013/0292195 A1* | 11/2013 | Gibson | B60K 6/48 180/53.1 |
| 2013/0296100 A1 | 11/2013 | Nefey et al. | |
| 2013/0296108 A1* | 11/2013 | Ortmann | B60K 6/383 477/5 |
| 2013/0310216 A1* | 11/2013 | Kamiya | F16D 48/0206 477/5 |
| 2014/0162839 A1* | 6/2014 | Miyazaki | B60K 6/48 477/5 |
| 2014/0357434 A1* | 12/2014 | Lundberg | F16H 9/125 474/28 |
| 2014/0378273 A1* | 12/2014 | Gibson | B60W 20/00 477/5 |
| 2015/0066264 A1* | 3/2015 | Wang | B60W 20/108 701/22 |
| 2015/0099607 A1* | 4/2015 | Yamazaki | B60W 10/02 477/5 |
| 2015/0232086 A1* | 8/2015 | McGee | B60W 10/02 477/5 |
| 2015/0307075 A1* | 10/2015 | Leone | B60W 10/02 701/55 |
| 2016/0114780 A1* | 4/2016 | Gibson | B60W 10/02 477/53 |

OTHER PUBLICATIONS

Cunningham, Ralph Wayne, et al., "System and Method for Controlling a Torque Converter Clutch," U.S. Appl. No. 15/195,652, filed Jun. 28, 2016, 33 pages.

* cited by examiner

SYSTEM AND METHOD FOR DRIVING VEHICLE ACCESSORIES

BACKGROUND/SUMMARY

A vehicle's engine may drive accessories including an air conditioning compressor, alternator, power steering pump, and vacuum pump. The accessories may be driven from the engine's crankshaft via a belt and pulley system located at the front side of the engine. During some conditions, fuel flow to engine cylinders may be ceased to conserve fuel. The accessories may continue to receive power from the vehicle's wheels while the engine spins. If the vehicle includes an automatic transmission with torque converter, the torque converter's lockup clutch may be fully closed while the vehicle is decelerating. The vehicle's kinetic energy may be delivered to the engine via the transmission and vehicle wheels when the torque converter clutch is locked. However, a significant portion of the vehicle's kinetic energy may be consumed by rotating the engine, which may not provide useful work. Further, the vehicle may not coast as far as is desired when the vehicle's kinetic energy is used to rotate the unfueled engine. Consequently, a significant portion of the vehicle's kinetic and potential energy may be lost. In addition, the additional torque to spin and accelerate the engine may lead to reduced occupant comfort levels during vehicle deceleration and downshifting. Having so accelerate a large inertia (like an engine) during a downshift may lead to a "head bob," a short-lived vehicle deceleration that may be produced when a large rotating inertia is accelerated by the vehicle's kinetic energy.

The inventors herein have recognized the above-mentioned issues and have developed a method for operating a driveline of a vehicle, comprising: unlocking a torque converter clutch and driving on-board vehicle accessories via an accessory drive coupled to a driveline at or downstream of a torque converter turbine and upstream of a transmission gear clutch in response to a request to drive the on-board vehicle accessories and decelerate a vehicle in a first mode.

By unlocking a torque converter in response to a request to decelerate a vehicle and drive on-board vehicle accessories, an engine may be effectively decoupled from a driveline so that the driveline may continue to rotate without having to rotate the engine. In particular, a torque converter transmits little torque from vehicle wheels to an engine when the torque converter's lockup clutch is open. Consequently, a higher portion of a vehicle's potential and kinetic energy may be used to drive vehicle accessories instead of rotating an engine. Further, a greater portion of the vehicle's kinetic and potential energy may be used to coast the vehicle to a location down a road the vehicle is traveling. However, if increased driveline braking is desired to maintain vehicle speed down an incline, the torque converter clutch may be locked to provide engine braking to the driveline.

The conventional way of configuring an engine puts the accessories on the front of the engine upstream of the engine and transmission. This configuration has the disadvantage of having to spin the engine with all of it frictional losses to power the accessories from the vehicle's kinetic energy. The invented arrangement allows this the engine to rotate with the accessories while allowing other modes of operation where spinning the engine with the accessories is not required. Thus, the accessories can be driven by the engine alone or the vehicle's kinetic energy alone. Additional favorable control modes may be provided based on this capability.

The present description may provide several advantages. For example, the approach may increase vehicle driveline efficiency. Additionally, the approach may increase vehicle fuel economy. Further, the approach may increase recovery of a vehicle's potential and kinetic energy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
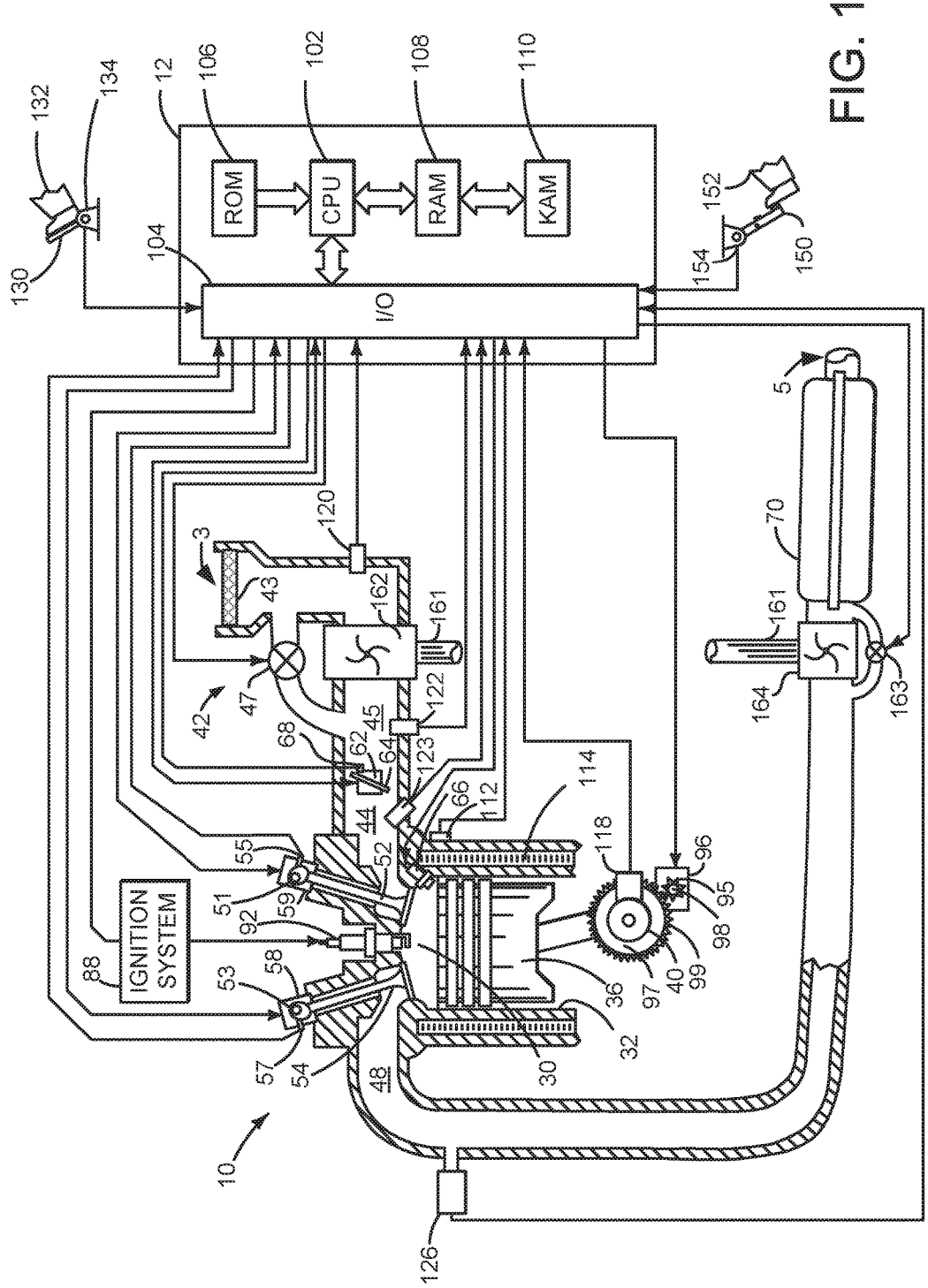
FIG. 1 shows a schematic depiction of an engine.
Figure 2:
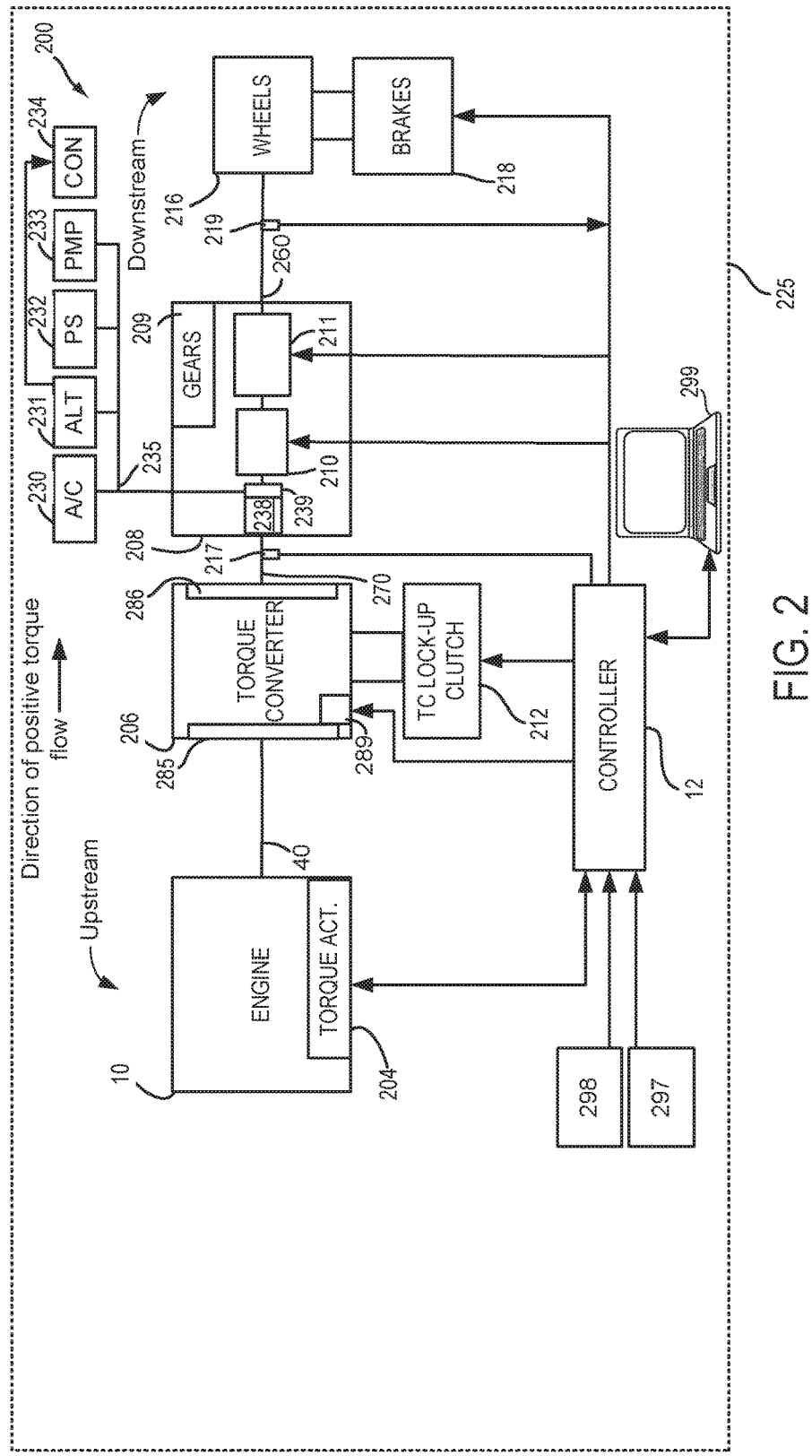
FIG. 2 shows a schematic depiction of an example vehicle powertrain including an engine.

The present description is related to operating a vehicle powertrain that includes an engine that is coupled to a transmission that includes a torque converter. The torque converter includes a torque converter lockup clutch to bypass the torque convertor's fluidic torque path. The engine may be configured as is shown in FIG. 1. The engine of FIG. 1 may be incorporated into a vehicle powertrain as shown in FIG. 2, and the engine may be the sole or only adjustable torque source in the powertrain. The vehicle may operate as shown in the two different vehicle stopping and launch sequences of FIG. 3. The powertrain may be operated according to the method shown in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a powertrain or driveline 200. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to impeller 285 of torque converter 206. Torque converter impeller 285 is mechanically coupled to transmission pump 289. Mechanically driven transmission pump 289 supplies pressurized transmission fluid to forward transmission clutch 210 and gear clutches (e.g., gear clutches 1-10). Torque converter 206 also includes a turbine 286 which is coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked closed. TCC is electrically operated by controller 12 (e.g., the hydraulic control is done electrically, the clutch apply force is hydraulic. Alternatively, TCC may be hydraulically locked closed. In one example, the torque converter may be referred to as a component of the transmission. Further, TCC may be partially closed, which provides an adjustable torque capacity for the TCC. The TCC provides a friction torque path through torque converter 206 while torque may also be transferred via fluid between impeller 206 and turbine 286. Torque transferred via fluid follows a fluidic torque path from impeller 285 to turbine 286.

When torque converter lock-up clutch 212 is fully disengaged, torque converter 206 transmits engine torque to automatic transmission 208 via fluid transfer from the torque converter impeller 285 to the torque converter turbine 286, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted via adjusting torque capacity of the TCC. The controller 12 may be configured to adjust the amount of torque transmitted by torque converter 212 by adjusting the torque converter lock-up clutch application pressure or force in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Automatic transmission 208 also includes an accessory drive 238 which extracts power from automatic transmission 208 to power on-board vehicle accessories. The accessories may include but are not limited to an alternator 231, an air conditioning compressor 230, a pump 233 (e.g., air pump, vacuum pump, etc.), and a power steering pump 232. Alternator 231 may supply electrical power to electrical consumers 234 (e.g., a battery, lights, sensors, actuators). In one example, accessory drive 238 is comprised of one or more gears such that the accessories may be driven at a multiple of vehicle speed and not a multiple of engine speed if the TCC is open. Accessory drive may be mechanically coupled to impeller 286, input shaft 270, or another transmission component that is mechanically coupled to shaft 270. Accessory drive clutch 239 may be opened to decouple accessories (e.g., 230-234) from transmission input shaft 270. Accessory drive clutch 239 may be closed to couple accessories (e.g., 230-234) to transmission input shaft 270. Accessory drive 238 may provide output via a pulley or gears and mechanical linkage 235 such as belts or gears. This arrangement has the net effect of being able to power accessories via solely the engine or solely via the kinetic energy of the vehicle during deceleration while retaining the ability to power the accessories with the vehicle's kinetic energy.

1) When accelerating or cruising, the accessory drive is spinning at a ratio of the torque converter's turbine speed. Thus, the engine is powering the accessory drive, through the torque converter.
2) When decelerating, the accessory drive is spinning at a ratio of the torque converter's turbine speed. The engine need not be on or even rotating. Thus, the vehicle kinetic energy is powering the accessory drive, through the torque converter.
3) When stopped or coasting, the transmission is in neutral but the torque converter is locked. This allows the engine to power the accessory drive alone.

Thus, engine 10 may be the only adjustable torque source that provides positive torque to powertrain 200. Alternatively, the driveline may include engine 10 along with motor/generator 201 as shown. Torque flows from engine 10 to transmission 208 before being applied to wheels 216. Thus, engine 10 is upstream of torque converter 206, transmission 208, and wheels 216 in a direction of torque flow. Further, torque converter 206 is upstream of forward clutch 210 and gear clutches 211.

The alternator may optionally be a motor/generator. As such it can operate certain accessory loads using battery power instead of engine power or vehicle kinetic energy. Also, it can add/subtract a small portion of propulsion torque.

Controller 12 may be configured to receive inputs from engine 10, as shown in more detail in FIG. 1, and accordingly control a torque output of the engine and/or operation of the torque converter, transmission, clutches, and/or brakes. Further, controller 12 may receive driver input from man/machine interface 299. In some examples, man/machine interface 299 may provide powertrain information and indications to a driver. Further, a driver may input requested driveline operating modes and other control requests to controller 12 via interface 299. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may also receive vehicle position and direction information from global positioning system (GPS) receiver 297 and/or inclinometer 298. The GPS receiver may indicate the direction of vehicle travel and whether the vehicle is directed uphill or downhill. Further, the GPS data may be used to index maps stored in the GPS or controller 12 to indicate road grade at the vehicle's present position. Alternatively, or in addition, road grade may be determined from inclinometer 298.

The system of FIGS. 1 and 2 provides for a vehicle system, comprising: an engine; a transmission including a torque converter, torque converter lockup clutch, an accessory drive, an accessory drive clutch positioned at or downstream of the torque converter and upstream of a transmission gear clutch. The vehicle system further comprises a controller including executable instructions stored in non-transitory memory to close the torque converter clutch at zero vehicle speed in response to a request to drive vehicle accessories. The vehicle system further comprises additional instructions to engage the transmission in neutral when a speed of a vehicle in which the engine resides is within a threshold speed of zero. The vehicle system further comprises additional instructions to open the accessory drive clutch in response to a request to downshift the transmission. The vehicle system further comprises additional instructions to adjust a torque capacity of the torque converter lockup clutch in response to a load on the accessory drive. The vehicle system further comprises additional instructions to close the torque converter clutch in response to a request to charge a battery via an alternator electrically coupled to the accessory drive.

Figure 3:
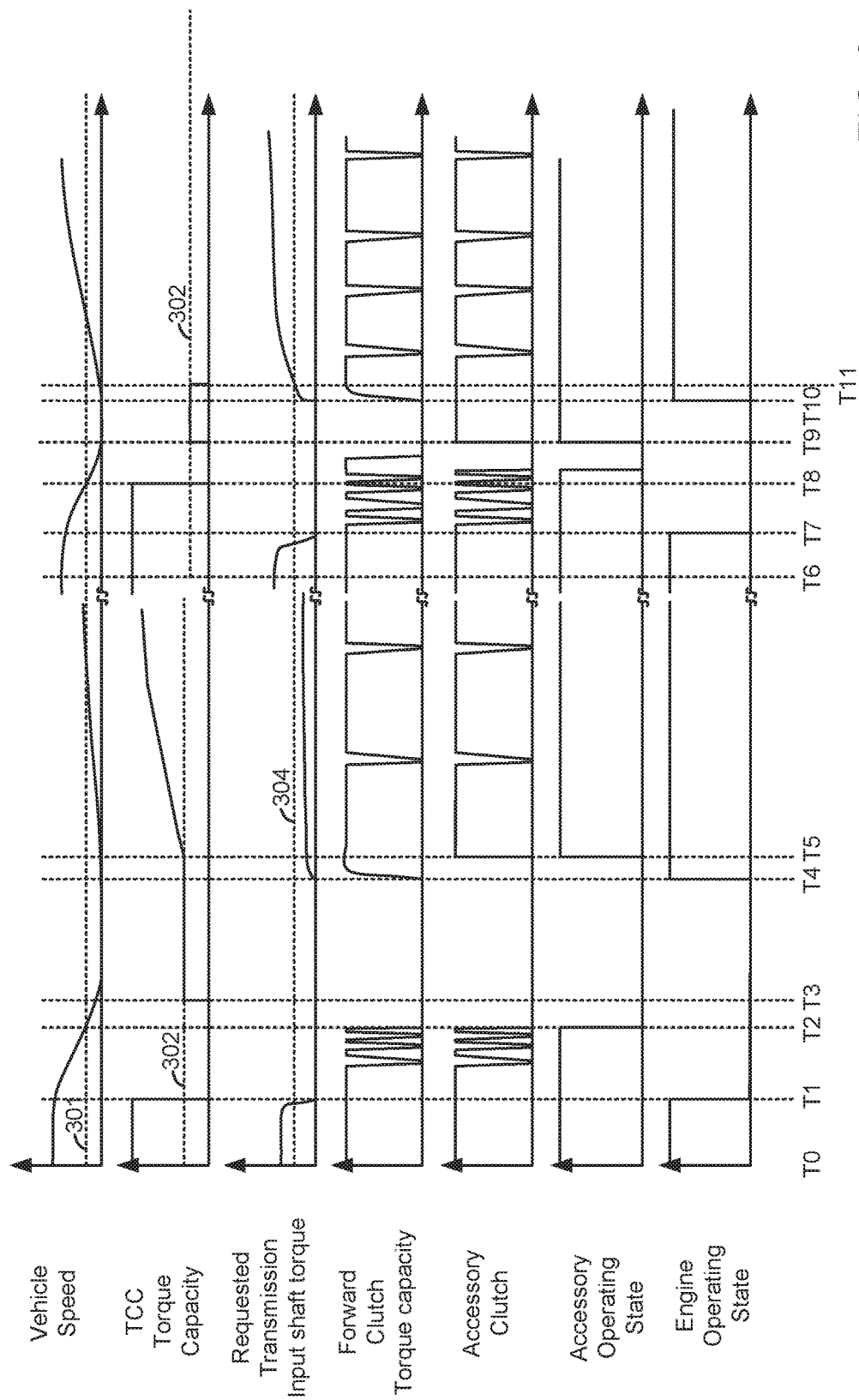
FIG. 3 shows example plots of two different vehicle stopping and launch sequences.

Referring now to FIG. 3, plots of two different prophetic vehicle launch sequences are shown. The plots are aligned in time. The sequences may be provided by the system of FIGS. 1 and 2 according to the method of FIG. 4. Vertical markers T0-T11 represent times of particular interest in the sequence. The double SSs along the horizontal axes of each plot represent breaks in time. The break in time may be long or short in duration.

The first sequence includes extended vehicle coasting and a vehicle launch with reduced engine cranking torque. The second sequence includes engine braking vehicle coasting and a vehicle launch with early vehicle accessory activation.

The first plot from the top of FIG. 3 is a plot of vehicle speed versus time. The vertical axis represents vehicle speed and vehicle speed increases in the direction of the vertical axis arrow. The horizontal axis represents time and time increases from the left side of FIG. 3 to the right side of FIG. 3. The horizontal line 301 represents a threshold vehicle speed below which the TCC may be fully opened and vehicle brakes may be applied.

The second plot from the top of FIG. 3 is a plot of torque converter clutch (TCC) torque capacity versus time. The vertical axis represents TCC clutch torque capacity and TCC clutch torque capacity increases in the direction of the vertical axis arrow. The horizontal axis represents time and time increases from the left side of FIG. 3 to the right side of FIG. 3. The horizontal line 302 represents a non-zero TCC torque capacity that the TCC is adjusted to for launching a vehicle. The TCC torque capacity for launching the vehicle is adjustable based on vehicle operating conditions. For example, the TCC torque capacity for launching the vehicle may be reduced or increased in response to a transmission temperature. Specifically, the TCC torque capacity for launching the vehicle may be reduced in response to a transmission temperature greater than a threshold. Similarly, the TCC torque capacity for launching the vehicle may be increased in response to the transmission temperature being less than the threshold. TCC torque capacity is a maximum amount of torque the TCC may transmit from one side (e.g., input side, which is coupled to a torque source) of the TCC to the other side (e.g., output side, which is coupled to the transmission input shaft) of the TCC when a particular TCC closing force is applied to the TCC. The TCC closing force may be based on a pressure of hydraulic fluid supplied to the TCC, an electrical voltage applied to the TCC, or other attribute of a force transfer medium. The TCC torque capacity may be decreased then increased during transmission gear shifting to smooth transmission shifting.

The third plot from the top of FIG. 3 is a plot of requested transmission input shaft torque versus time. The vertical axis represents requested transmission input shaft torque and requested transmission input shaft torque increases in the direction of the vertical axis arrow. The horizontal axis represents time and time increases from the left side of FIG. 3 to the right side of FIG. 3. In one example, the requested transmission input shaft torque may be based on a position of an accelerator pedal and vehicle speed. For example, accelerator pedal position and vehicle speed may index a table or function of empirically determined values of requested transmission input shaft torque. The table outputs a value based on the accelerator pedal position and the vehicle speed. The requested transmission input shaft torque may be provided solely by an engine, the engine and a motor/generator, or solely via the motor/generator.

The fourth plot from the top of FIG. 3 is a plot of forward clutch torque capacity versus time. The vertical axis represents forward clutch torque capacity and forward clutch torque capacity increases in the direction of the vertical axis arrow. The horizontal axis represents time and time increases from the left side of FIG. 3 to the right side of FIG. 3. Horizontal line 304 is a transmission input torque level below which the TCC may be closed to provide the non-zero torque capacity for launching a vehicle. If the requested transmission torque during a vehicle launch is greater than threshold 304, the TCC may be opened.

The fifth plot from the top if FIG. 3 is a plot of accessory drive clutch operating state versus time. The accessory drive clutch included in the transmission is closed when the trace is at a higher level near the vertical axis arrow. Accessories may be operated via mechanical power extracted from the transmission when the accessory clutch is closed. The accessory drive clutch is open when the trace is at a lower level near the horizontal axis. The accessories do not receive power from the transmission when the accessory drive clutch is open.

The accessory drive clutch may be a desired option. It allows one to decouple both the steady accessory torque and the inertial torque of the accessories. This has a benefit during shifting for the objective of smoothing acceleration and deceleration torque. It can reduce torque disturbances that may lead to disturbances during downshifts and upshifts.

The sixth plot from the top of FIG. 3 is a plot of accessory operating state versus time. Accessories may be activated and deactivated when the accessory clutch is engaged so that power supplied to accessories may be reduced even if the accessory clutch is closed. For example, current may be supplied to a field of an alternator to activate the alternator. Current may be cut off from the field to deactivate the alternator. The accessories are activated when the trace is at a higher level near the vertical axis arrow. The accessories are deactivated when the trace is at a lower level near the horizontal axis.

The seventh plot from the top of FIG. 3 is a plot of engine operating state versus time. The engine is combusting air and fuel when the trace is at a higher level near the vertical axis arrow. The engine is not combusting air and fuel when the trace is at a lower level near the horizontal axis.

At time T0, the vehicle speed is at a medium level and the TCC torque capacity is at a higher level. The requested transmission input torque is a medium level and the forward clutch torque capacity is at a higher level. The accessory clutch is engaged to drive accessories. The accessories and the engine are activated.

Between time T0 and time T1, the vehicle speed begins to decrease in response to the requested transmission input shaft torque decreasing. The TCC torque capacity remains at a higher level and the forward clutch torque capacity decreases and increases in response to the transmission downshifting through gears. The engine is operating combusting air and fuel. The accessory clutch is closed and the accessories are operating.

At time T1, the TCC torque capacity is reduced to zero by opening the TCC in response to the decrease in requested transmission input shaft torque vehicle speed being within a threshold speed of vehicle speed being zero. The requested transmission input shaft torque is near zero and the forward clutch torque capacity is at a high level. The engine is deactivated by ceasing to supply fuel to engine cylinders. The accessory clutch is closed so that accessories are driven via kinetic energy supplied by the vehicle's wheels. The accessories are active. The vehicle begins to coast without turning the engine via the vehicle's kinetic energy since the TCC is open. Further, the vehicle's kinetic energy is converted to electrical energy via charging a battery through the alternator. Additionally, the vehicle's kinetic energy may drive the air conditioning compressor and other accessories since the accessories are driven via the transmission input shaft, which remains coupled to the vehicle's wheels. If it is desired to further extend the vehicle's coasting distance, one or more accessories may be deactivated and the accessory clutch may be opened. In this example, the accessories remain active and the accessory clutch is closed to operate accessories while the vehicle is decelerating. Thus, the vehicle's kinetic energy may be converted into electrical energy or useful work to operate the accessories while the engine is not combusting air and fuel. Such operation may extend the vehicle's coasting distance and improve conversion of the vehicle's kinetic energy into useful energy to operate accessories.

Between time T1 and time T2, the vehicle speed continues to be reduced and the TCC remains open. The requested transmission input shaft torque remains at a low level. The forward clutch is opened and closed several times while the vehicle decelerates and the transmission is downshifted. The optional accessory clutch is also opened in response to each downshift, and the accessory clutch is closed after the transmission downshifts from a higher gear to a lower gear. Opening the accessory drive clutch reduces inertia at the transmission's input shaft so that during a downshift the torque produced by the inertia and angular acceleration at the input shaft of the transmission may be reduced to improve shift feel. The accessories remain active in this example, but the accessories may be deactivated during a shift and reactivated after the shift.

At time T2, the vehicle speed is less than threshold 301 so the forward clutch is opened to decouple the transmission input shaft from the wheels. Further, vehicle wheel brakes are applied to slow and stop the vehicle from moving (not shown). The accessory clutch is also opened in response to the low vehicle speed and the engine being stopped. The TCC remains open and the requested transmission input shaft torque remains at a low level.

At time T3, the TCC torque capacity is increased in response to the forward clutch capacity being reduced to within a threshold torque of zero (e.g., less than 20 N-m of torque capacity in the forward clutch), the forward clutch may be commanded fully open. The TCC torque capacity is increased to threshold 302 so that engine torque may be transferred through the friction torque path (e.g., through the TCC) during vehicle launch (e.g., increase in requested transmission input shaft torque while vehicle speed is zero or a creep speed, the creep speed a speed the vehicle travels at after the vehicle is stopped and then the vehicle brakes are released without applying the accelerator pedal).

At time T4, the requested transmission input shaft torque is increased while the TCC torque capacity is at level 302. The engine is started in response to the increase in requested transmission input shaft torque and the forward clutch capacity is increased to transfer engine torque to the vehicle wheels to propel the vehicle. Vehicle speed begins increasing and the TCC remains applied, though not locked (e.g., allowing less than 40 RPM slip between the torque converter impeller and turbine). The requested transmission input shaft torque remains below threshold 304 so that the TCC remains partially closed such that the TCC torque capacity is at the level of 302. The torque represented by 304 may be a same level of torque as 302. Launching the vehicle with the TCC closed may increase driveline efficiency and conserve fuel. The accessory clutch remains open and the accessories are not activated. Opening the accessory clutch reduces engine cranking torque. The vehicle may launch with clutches for a low torque launch or with the benefit of torque converter torque multiplication for a high torque launch.

At time T5, the accessory clutch is closed and the accessories are activated. In one example, the accessory clutch is closed when engine speed exceeds engine idle speed. The vehicle speed continues to increase and the TCC torque capacity is increased in response to engine speed exceeding engine idle speed. The requested transmission input shaft torque remains below threshold 304 and the forward clutch capacity is at a high level.

After time T5, the forward clutch is opened and closed to upshift the transmission. The accessory clutch is opened at a same time the forward clutch is opened and the accessory clutch is closed after the forward clutch is closed. For example, that do not include a forward clutch, the accessory clutch may be opened at a same time as an off-going clutch and closed after an on-coming clutch is closed. An upshift from second gear to third gear may start by disengaging the second gear clutch (off going clutch), opening the accessory clutch while disengaging the second gear clutch, closing the third gear clutch (on coming clutch), and then closing the accessory clutch. Opening the accessory clutch reduces the driveline inertia at the transmission input shaft such that the torque produced from the inertia and the transmission input shaft acceleration may be reduced. Consequently, transmission gear shifting may be improved. The first vehicle launch sequence ends at the time break indicated by the double SS. This prioritizes the torque for the launch or shift by temporarily removing the power consumed by accelerating or driving the accessories. Electrical power and to some extent, the cooling system may operate from stored energy while the alternator or compressor ceases to be driven.

At time T6, the vehicle speed is at a medium level and the TCC torque capacity is at a higher level. The requested transmission input shaft torque is a medium level and the forward clutch torque capacity is at a higher level. The forward clutch torque capacity is high and the accessory clutch is closed. The accessories and the engine are operating.

Between time T6 and time T7, the vehicle speed begins to decrease in response to the requested transmission input shaft torque decreasing. The TCC torque capacity remains at a higher level and the forward clutch torque capacity is also at a higher level. The engine is activated and the accessory clutch is closed. The accessories are also activated.

At time T7, the engine enters deceleration fuel shut off (DFSO) where the engine cylinders are deactivated via ceasing to supply fuel to the engine cylinders. Vehicle speed continues to decrease and the TCC capacity is at a high level where the TCC is fully closed. By the engine cylinders being deactivated and the TCC being closed, the engine continues to rotate via torque supplied from the vehicle's kinetic energy through the vehicle's wheels. Rotating the engine without combustion results in engine breaking that decelerates the vehicle. The requested transmission input shaft torque is a low level and the forward clutch is closed. The accessory clutch is also closed and the accessories are activated. This may be described as an engine braking mode.

Between time T7 and time T8, the transmission is downshifted and the accessory clutch is opened during the transmission downshifts and closed after the downshifts. The accessories remain active and the engine remains in DFSO mode.

At time T8, the TCC torque capacity is reduced to zero by opening the TCC in response to vehicle speed being within a threshold speed of vehicle speed being zero. Opening the TCC allows the engine rotational speed to decelerate to zero (not shown). The requested transmission input shaft torque is near zero and the forward clutch torque capacity is adjusted to zero. Opening the forward clutch allows the TCC to be applied when the engine is restarted without transferring torque to the vehicle's wheels. The vehicle brakes are also applied (not shown).

Between time T8 and time T9, the vehicle speed reaches zero and the vehicle is stopped. The transmission downshifts one more time and the accessories are active. The TCC torque capacity is zero so engine torque would not be transferred through the TCC if the engine were active and combusting air and fuel. The requested transmission input torque is zero and the forward clutch torque capacity is reduced to zero. The applied vehicle brakes stop the vehicle from moving (not shown).

At time T9, the TCC torque capacity is increased in response to the forward clutch capacity being reduced to within a threshold torque of zero (e.g., less than 20 N-m of torque capacity in the TCC). The TCC torque capacity is increased to threshold 302 so that engine torque may be transferred through the friction torque path during vehicle launch. The threshold 302 is reduced as compared to the level of threshold 302 at time T1. The threshold 302 may be adjusted based on a transmission temperature or other condition. The accessory clutch is closed and accessories are active so that when the engine is restarted, the accessories may be powered right away. In one example, the accessory clutch may be closed during engine starting in response to a request to charge the vehicle's battery. The engine remains stopped at time T9, but in other examples, the engine may be rotating and combusting air and fuel to power the accessories without moving the vehicle via opening the forward clutch or a gear clutch until an increase in transmission input shaft torque is requested.

At time T10, the requested transmission input shaft torque is increased while the TCC torque capacity is at level 302. The engine is restarted combusting air and fuel in response to the increase in the transmission input shaft torque request. The forward clutch capacity is increased to transfer engine torque to the vehicle wheels to propel the vehicle after the engine reaches a desired speed (e.g., idle speed). Vehicle speed begins increasing and the TCC remains applied, though not locked. The requested transmission input shaft torque remains below threshold 304 so that the TCC remains closed such that the TCC torque capacity is at the level of 302.

At time T11, the requested transmission input shaft torque exceeds threshold 304. As a result, the TCC torque capacity is reduced via opening the TCC. The TCC may be partially or fully opened in response to the requested transmission input shaft torque exceeding threshold 304. In this example, the TCC is fully opened so that the TCC torque capacity is substantially zero (e.g., less than 5% of the TCCs torque capacity when a rated pressure or force is applied to the TCC). By reducing the TCC torque capacity, torque converter torque multiplication may be increased and TCC slippage (e.g., speed difference between TCC torque input and TCC torque output) of the TCC may be increased to reduce the possibility of TCC degradation. The accessory clutch remains closed and the accessories remain active to provide accessory output. The engine also remains active and engine torque output increases in response to the increasing requested transmission input shaft torque.

Thus, the TCC may be controlled to improve vehicle launch by being at least partially closed where the TCC has capacity to transfer a threshold amount of torque to improve torque converter efficiency during a low torque demand vehicle launch. Alternatively, the TCC may be opened to reduce the possibility of TCC degradation during a high torque demand vehicle launch so as to increase torque converter torque multiplication and increase engine torque delivered to vehicle wheels. Further, the TCC may be closed during vehicle deceleration to provide engine breaking. Further still, the TCC may open while the accessories are driven via the vehicle's kinetic energy and wheels so that a greater portion of the vehicle's kinetic energy may be transferred to accessories.

Figure 4:
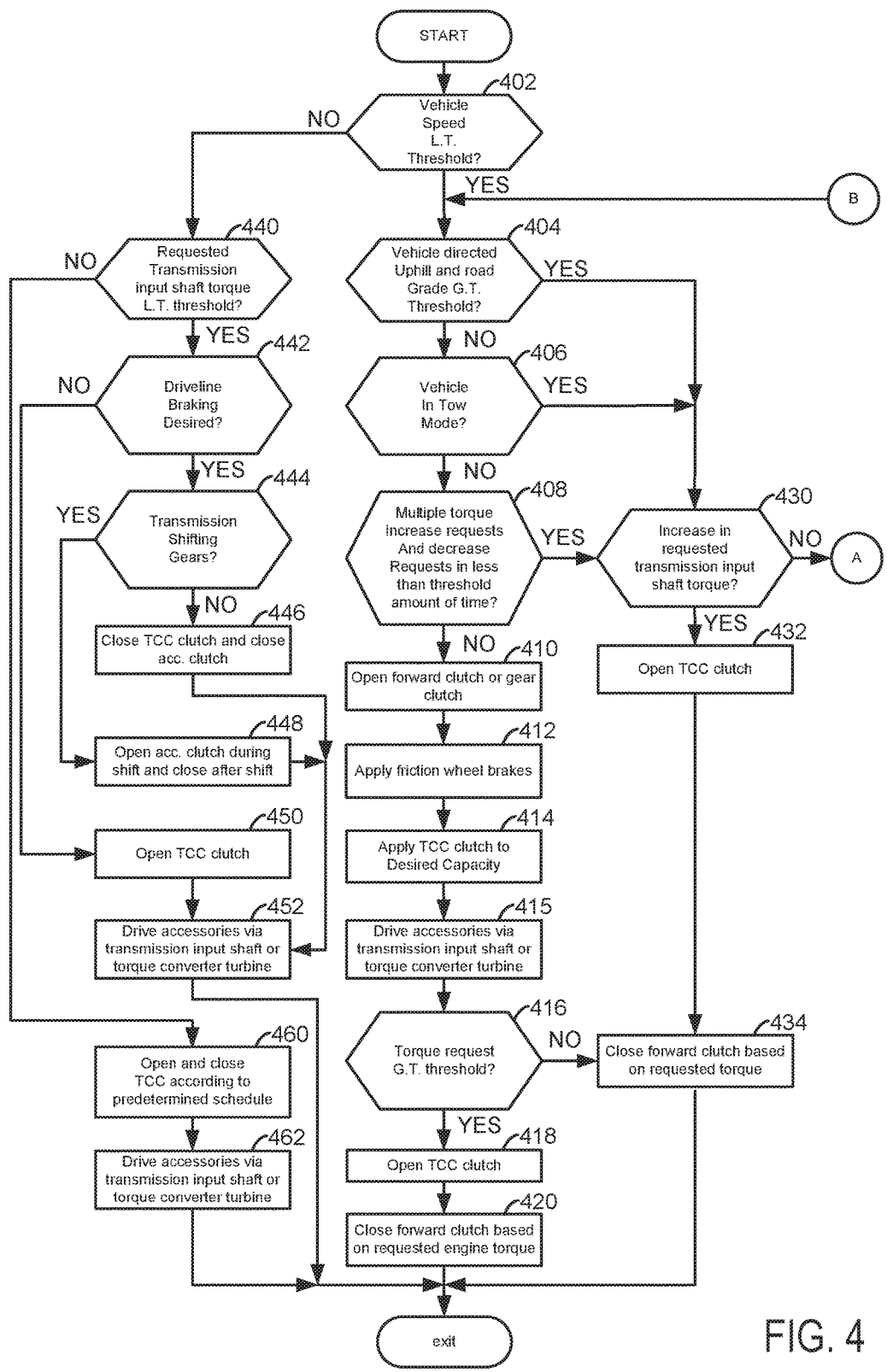
FIGS. 4 and 5 show an example method for operating a vehicle driveline.

Referring now to FIG. 4, a method for operating a vehicle driveline or powertrain is shown. The method of FIG. 4 may be applied to the powertrain shown in FIG. 1. Further, at least portions of the method of FIG. 4 may be included as executable instructions in the system of FIGS. 1 and 2. And, at least portions of the method of FIG. 4 may be actions taken within the physical world to transform states of a TCC, vehicle gears, and other engine and transmission components.

The invention adds the ability to drive accessories via the vehicle's kinetic energy without also having to spin the engine with it frictional losses. Further, it retains the ability to drive the accessories with the engine alone regardless of vehicle speed (which normally occurs in park and neutral of a conventional vehicle). And, it retains the ability to drive accessories while the engine is supplying driving power to the driven wheels. This mechanical arrangement and control approach allows new modes where the engine can be stopped when it is not needed for propulsion or for driving the accessories.

At 402, method 400 judges if vehicle speed is less than or equal to a threshold speed (e.g., zero). Vehicle speed may be determined via a transmission speed sensor or vehicle wheel sensors. If method 400 judges that the vehicle speed is less than a threshold speed (e.g., less than 8 KPH), the answer is yes and method 400 proceeds to 404. Otherwise the answer is no and method 400 proceeds to 440. Further, in some examples, method 400 may also add a condition of a request to drive accessories be met to proceed to 404. An accessory request may be a request for air conditioning, activation of a pump, a request to charge a battery, or a request for operating other devices powered by the accessory drive coupled to the transmission input shaft or torque converter turbine.

At 440, method 400 judges if the requested transmission input shaft torque is less than a threshold torque. Further, in some examples, method 400 may require that the accelerator pedal have been at least partially released within a threshold amount of time to proceed to 442. The requested transmission input shaft torque may be based on accelerator pedal position and vehicle speed. For example, a table or function of empirically determined transmission input shaft torques may be indexed via accelerator pedal position and vehicle speed. The table or function outputs desired or requested transmission input shaft torque. Alternatively, the table or function may output desired or requested engine torque and the requested engine torque may be converted to a requested transmission input shaft torque. If method 400 judges that the requested transmission input torque is less than a threshold torque, the answer is yes and method 400 proceeds to 442. Otherwise, the answer is no and method 400 proceeds to 460.

At 460, method 400 opens and closes the TCC according to a first predetermined TCC schedule. For example, the TCC may be opened at a beginning of a gear shift and closed after the gear shift is complete. Method 400 proceeds to 462.

At 462, method 400 drives accessories that are mechanically coupled to the transmission input shaft or torque converter turbine via the accessory drive exit after the TCC is operated according to a first schedule. Further, the accessory drive clutch may be opened in response to upshifting and down shifting the transmission to reduce inertia upstream of transmission clutches. The accessory drive clutch may be closed after the transmission shifts gears to power accessories. Method 400 proceeds to exit.

At 442, method 400 judges if the vehicle driveline braking is desired. If method 400 is in sailing mode, method 400 proceeds to 450. In sailing mode, the engine is operated in a speed control mode at idle speed. In speed control mode, engine torque is adjusted to hold engine speed at a desired speed. Engine torque is allowed to vary so that the engine speed is maintained at the desired speed (e.g., idle speed). Method 400 may judge that driveline braking is desired if vehicle speed is increasing with the transmission input shaft torque is less than a threshold or if the vehicle is traveling downhill. Further, method 400 may judge that driveling braking is desired if a driver requests driveline braking via a user input. Method 400 may judge that the driveline is in sailing mode if the transmission input shaft torque is less than a threshold, vehicle speed is greater than a threshold, and an increase in transmission input torque is expected. If method 400 judges that driveline braking is desired, the answer is yes and method 400 proceeds to 444. Otherwise, the answer is no and method 400 proceeds to 450. Additionally, the engine may be stopped via ceasing to supply engine cylinders with fuel. As such, the engine may be stopped if the TCC is opened when the requested transmission input shaft torque is less than a threshold.

At 450, method 400 opens the TCC. Additionally, or alternatively, the transmission may be shifted into neutral if accessories are not to be driven. Further, in some examples, engine rotation may be stopped by ceasing fuel flow to engine cylinders. The TCC is opened to disconnect the engine from the friction torque path (e.g., engine torque is transmitted to the torque converter impeller and through torque converter clutch to the torque converter turbine and the transmission input shaft) so that the engine may stop rotation and so that an increased amount of the vehicle's kinetic energy may be transferred to vehicle accessories. Thus, vehicle deceleration at a lower rate may be requested when DFSO is not requested. Opening the TCC may also extend the vehicle's coasting distance since the engine may not rotate via the vehicle's kinetic energy when the TCC is opened and when the engine is not supplied fuel. Method 400 proceeds to 452.

At 452, method 400 drives accessories via the accessory drive, which is directly coupled to the transmission input shaft or torque converter turbine, when vehicle accessory operation is requested. In one example, the accessories are driven via the vehicle's kinetic energy delivered through the vehicle's wheels. Additionally, the accessory drive clutch may be opened during transmission gear shifting. Method 400 proceeds to exit.

At 444, method 400 judges if the transmission is shifting gears. In one example, a bit in memory may indicate when transmission gears are being shifted. Transmission gears may be shifted based on vehicle speed and transmission input shaft torque according to a predetermined transmission shifting schedule. If method 400 judges that the transmission is shifting gears, the answer is yes and method 400 proceeds to 448. Otherwise, the answer is no and method 400 proceeds to 446.

At 448, method 400 opens the accessory drive clutch during downshifting and closes the accessory drive clutch after shifting. By opening the accessory drive clutch during downshifting, torque produced by the transmission input shaft angular acceleration and inertia at the transmission input shaft may be reduced. Consequently, shift smoothness may be improved. Method 400 proceeds to 452.

At 446, method 400 closes the TCC and the accessory drive clutch if it is open. By closing the TCC, the engine may be rotated using the vehicle's kinetic energy even though fuel flow to the engine is ceased. The engine provides driveline braking to reduce vehicle speed. Such operation may be desirable to control vehicle speed if the vehicle is traveling downhill. Method 400 proceeds to 452.

At 404, method 400 judges if the vehicle is directed uphill and operating on a road with a grade greater than a threshold. In one example, the vehicle direction and road grade may be determined via a GPS system. If method 400 judges that the vehicle is directed uphill and road grade at the vehicle's present position is greater than a threshold, the answer is yes and method 400 proceeds to 430. Otherwise, the answer is no and method 400 proceeds to 406.

Figure 5:
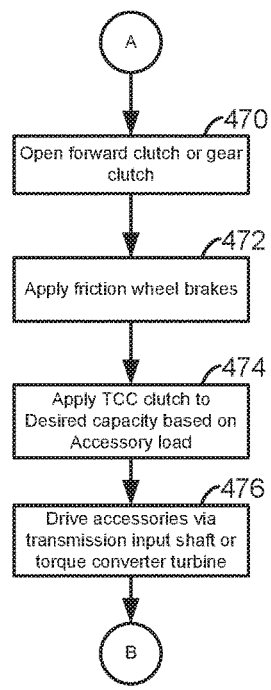

At 430, method 400 judges if there is an increase in the requested transmission input shaft torque. In one example, method 400 judges if a current requested transmission input shaft torque is greater than a previous value of requested transmission input shaft torque to determine if there is an increase in the requested transmission input shaft torque. If method 400 judges that there is an increase in the requested transmission input shaft torque, the answer is yes and method 400 proceeds to 432. Otherwise, the answer is no and method 400 proceeds to 470 of FIG. 5.

At 470, method 400 opens the forward clutch of the transmission. By opening the forward clutch, engine torque may not be transmitted to vehicle wheels. Method 400 proceeds to 472.

At 472, method 400 applies the vehicle's friction brakes to the vehicle's wheels to reduce the possibility of vehicle movement. Method 400 proceeds to 474.

At 474, method 400 closes the TCC to adjust a torque capacity of the TCC based on a load of the accessories. In one example, accessory loads may be empirically determined and stored to a table or function in controller memory.

The accessory loads or tables may be indexed based on the driven accessory load and the table outputs a value. The TCC is torque capacity is adjusted to the value plus an offset to reduce the possibility of TCC slippage. If accessories are not requested, the TCC may be opened. The engine is also started if there is a request for accessories (e.g., a request to charge a battery via an alternator) and the engine is stopped. The accessories receive torque from the engine without the engine delivering torque to the vehicle wheels since the TCC is closed and the forward clutch is open. Alternatively, a gear clutch may be opened if the transmission does not have a forward clutch. Method 400 proceeds to 476.

At 476, method 400 drives accessories via the accessory drive, which is directly coupled to the transmission input shaft or torque converter turbine. The accessories are driven via the engine which delivers torque via the friction torque path through the TCC. Method 400 returns to 404.

At 432, method 400 opens the TCC. The TCC may be fully opened or substantially fully opened (e.g., opened to that the TCC has less than 5% of the TCCs torque capacity when a rated pressure or force is applied or released to fully open the TCC) so that the TCCs torque capacity is reduced to zero or near zero. By reducing the TCCs torque capacity, torque may be transferred from the vehicle's engine to the vehicle's transmission input shaft via fluid flowing between the torque converter impeller and the torque converter turbine (e.g., the fluidic torque path) rather than through the TCCs friction plates. Method 400 proceeds to 434.

At 434, method 400 closes the transmission forward clutch if the forward clutch is open. By closing the forward clutch, the engine torque may be transferred to the vehicle wheels to propel the vehicle. However, since the TCC is open, engine speed may have to reach a threshold speed before the torque converter transfers engine torque to the transmission to launch the vehicle. Alternatively, if the transmission does not include a forward clutch, a gear clutch may be closed. Method 400 proceeds to exit.

At 406, method 400 judges if the vehicle is in a tow or haul mode. In one example, the vehicle may be in a tow or haul mode when a driver selects tow or haul mode using a human/machine interface. In tow or haul mode, the transmission gears upshift at higher vehicle speeds and transmission input torque levels than base transmission gear shifting. Additionally, the transmission downshift higher engine speeds than base transmission gear shifting. The torque converter clutch may also be locked according to a second predetermined schedule that is different from the first schedule. If method 400 judges that the vehicle is in tow or haul mode, the answer is yes and method 400 proceeds to 430. Otherwise, the answer is no and method 400 proceeds to 408. Being in tow or haul mode indicates that a higher amount of torque may be used to launch the vehicle. Therefore, it may be desirable to launch the vehicle with the TCC open to reduce the possibility of TCC degradation.

At 408, method 400 judges if multiple transmission input shaft torque increases and transmission input shaft torque decreases have occurred within a predetermined amount of time. For example, method 400 may judge if the transmission input shaft torque has increased twice and the transmission input shaft torque has decreased twice in less than 5 seconds while vehicle speed is less than the threshold. If method 400 judges that a plurality or multiple transmission input shaft torque increases and transmission input shaft torque decreases have occurred within a predetermined amount of time, the answer is yes and method 400 proceeds to 430. Otherwise, the answer is no and method 400 proceeds to 410. In this way, the TCC may be opened to reduce TCC heating and degradation.

At 410, method 400 opens the transmission forward clutch. The forward clutch may be fully opened or opened to provide less than a threshold amount of torque capacity for the forward clutch (e.g., less than 5% of the maximum forward clutch torque capacity when a rated pressure or force is applied to fully close the forward clutch). Opening the forward clutch may put the transmission in neutral. The forward clutch is opened so that the TCC may be closed without delivering engine torque to the vehicle's wheels. Method 400 proceeds to 412 after opening the forward clutch.

At 412, method 400 applies friction brakes to the vehicle's wheels to reduce vehicle motion. Thus, the brakes are applies so that the vehicle may remain stationary until the driver increases the transmission input shaft torque request. Method 400 proceeds to 414 after vehicle brakes are applied.

At 414, method 400 at least partially closes the TCC to provide a desired TCC torque capacity. The desired TCC torque capacity is greater than zero and it may be varied based on vehicle operating conditions. Further, in one example, the TCC torque capacity is a torque sufficient to launch the vehicle from zero speed to a threshold speed in a predetermined amount of time. For example, the TCC torque capacity may be increased to 100 N-m via at least partially closing the TCC. In one example, the TCC capacity is adjusted to a non-zero torque capacity that is a capacity sufficient to accelerate the vehicle to a desired speed in a threshold amount of time. Further, the TCC capacity may be based on the load provided by the accessories to the driveline. For example, the accessory loads may be empirically determined and stored to memory. Values of accessory load may be retrieved from memory based on the accessory loads that are activated. If the air conditioning compressor is activated and consumes 25 N-m of torque, the TCC torque capacity may be increased by 25 N-m plus a predetermined offset (e.g., 5 N-m). Method 400 proceeds to 415.

At 415, method 400 drives accessories via the accessory drive, which is directly coupled to the transmission input shaft or torque converter turbine. Further, if accessories are requested to operate, the engine may be activated at 415 if the engine is stopped. The accessories are driven via the engine transferring torque through the friction torque path. The friction torque path is activated via closing the TCC. Method 400 proceeds to 416.

At 416, method 400 judges if the transmission input shaft torque request is greater than a threshold. In other examples, the torque request may be an engine torque request, a motor torque request, or a sum of engine and motor torque requests. If method 400 judges that the torque request is greater than the threshold, the answer is yes and method 400 proceeds to 418. Otherwise, the answer is no and method 400 proceeds to 434.

At 418, method 400 opens the TCC. The TCC may be fully opened or substantially fully opened (e.g., opened to that the TCC has less than 5% of the TCCs torque capacity when a rated pressure or force is applied or released to fully open the TCC) so that the TCCs torque capacity is reduced to zero or near zero. By reducing the TCCs torque capacity, torque may be transferred from the vehicle's engine to the vehicle's transmission input shaft via fluid flowing between the torque converter impeller and the torque converter turbine rather than through the TCCs friction plates. Method 400 proceeds to 420.

At 420, method 400 closes the transmission forward clutch responsive to the requested transmission input shaft torque. For example, if the requested transmission torque is increased, the additional pressure or force may be applied to close the forward clutch, thereby increasing the forward clutch's torque capacity responsive to the requested transmission torque. As a result, torque to the vehicle's wheels increases as the transmission input shaft torque request increases and the vehicle may launch from a lower vehicle speed to a higher vehicle speed. Alternatively, method 400 may close a gear clutch if the transmission does not include a forward clutch. Method 400 proceeds to exit.

Thus, the method of FIG. 4 provides for a method for operating a driveline of a vehicle, comprising: unlocking a torque converter clutch and driving on-board vehicle accessories via an accessory drive coupled to a driveline at or downstream of a torque converter turbine and upstream of a transmission gear clutch in response to a request to drive the on-board vehicle accessories and decelerate a vehicle in a first mode. The method further comprising, locking or holding locked, a torque converter clutch and driving on-board vehicle accessories via the accessory drive in response to a request to decelerate a vehicle and drive the on-board vehicle accessories in a second mode.

In some examples, the method further comprises ceasing to supply fuel to an engine of the vehicle and driving the on-board vehicle accessories while the engine is stopped. The method further comprises operating an engine of the vehicle at a constant speed in a speed control mode and driving the on-board vehicle accessories at a speed that is a multiple of vehicle speed and not equal to engine speed. The method further comprises continuing to drive the on-board vehicle accessories via opening a transmission clutch to place a transmission of the vehicle in neutral and closing the unlocked torque converter in response to vehicle speed being within a threshold speed of zero speed. The method further comprises adjusting a torque capacity of the torque converter clutch to provide a non-zero torque sufficient to rotate the on-board vehicle accessories at a multiple of engine speed. The method further comprises adjusting the torque capacity of the torque converter clutch to have sufficient capacity to accelerate the vehicle when a clutch of the transmission is closed.

The method of FIG. 4 also provides for a method for operating a driveline of a vehicle, comprising: unlocking a torque converter clutch and decoupling on-board vehicle accessories coupled to the driveline at a location at or downstream of a torque converter turbine and upstream of a transmission gear clutch in response to a request to shift gears of a transmission. The method includes where request to shift gears is a request to engage a lower gear, and further comprising decelerating the vehicle via ceasing to supply fuel to an engine of the vehicle while engaging the lower gear. The method further comprises adjusting a torque capacity of the torque converter clutch based on a load of the on-board vehicle accessories in response to a vehicle speed being within a threshold speed of zero vehicle speed. The method further comprises adjusting a torque capacity of the torque converter clutch based on a predetermined torque that is sufficient to accelerate the vehicle at a predetermined rate. The method further comprises automatically starting the engine in response to an increase in a requested transmission input shaft torque. The method further comprises opening a forward clutch of the transmission in response to the vehicle speed being less than the threshold. The method further comprises closing the forward clutch in response to an increase in a desired transmission input shaft torque.

In this way, the TCC may be controlled to transfer engine torque via a friction path during low transmission input shaft torque requests. The TCC may be controlled to release during high transmission input shaft torque requests so that engine torque is transferred via a hydraulic torque path between the torque converter impeller and the torque converter turbine where transmission fluid is the torque transfer medium. It should also be noted that the TCC may transfer only engine torque if the vehicle is configured with the engine as the sole torque source in the driveline. Alternatively, the TCC may transfer motor torque and/or engine torque to launch the vehicle according to the method of FIG. 4. Further, the TCC may be opened or closed to increase or decrease a distance the vehicle may coast.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a driveline of a vehicle, comprising:
   unlocking a torque converter clutch and driving on-board vehicle accessories via an accessory drive coupled to the driveline at or downstream of a torque converter turbine and upstream of a transmission gear clutch in response to a request to drive the on-board vehicle accessories and decelerate the vehicle in a first mode.

2. The method of claim 1, further comprising locking or holding locked, the torque converter clutch and driving on-board vehicle accessories via the accessory drive in response to a request to decelerate the vehicle and drive the on-board vehicle accessories in a second mode.

3. The method of claim 1, further comprising ceasing to supply fuel to an engine of the vehicle and driving the on-board vehicle accessories while the engine is stopped.

4. The method of claim 1, further comprising operating an engine of the vehicle at a constant speed in a speed control mode and driving the on-board vehicle accessories at a speed that is a multiple of vehicle speed and not equal to engine speed.

5. The method of claim 1, further comprising continuing to drive the on-board vehicle accessories via opening a transmission clutch to place a transmission of the vehicle in neutral and closing the unlocked torque converter clutch in response to vehicle speed being within a threshold speed of zero speed.

6. The method of claim 5, further comprising adjusting a torque capacity of the torque converter clutch to provide a non-zero torque sufficient to rotate the on-board vehicle accessories at a multiple of engine speed.

7. The method of claim 6, further comprising adjusting the torque capacity of the torque converter clutch to have sufficient capacity to accelerate the vehicle when a clutch of the transmission is closed.

8. A method for operating a driveline of a vehicle, comprising:
   unlocking a torque converter clutch and decoupling on-board vehicle accessories coupled to the driveline at a location at or downstream of a torque converter turbine and upstream of a transmission gear clutch in response to a request to shift gears of a transmission.

9. The method of claim 8, where the request to shift gears is a request to engage a lower gear, and further comprising decelerating the vehicle via ceasing to supply fuel to an engine of the vehicle while engaging the lower gear.

10. The method of claim 9, further comprising adjusting a torque capacity of the torque converter clutch based on a load of the on-board vehicle accessories in response to a vehicle speed being within a threshold speed of zero vehicle speed.

11. The method of claim 10, further comprising adjusting the torque capacity of the torque converter clutch based on a predetermined torque that is sufficient to accelerate the vehicle at a predetermined rate.

12. The method of claim 11, further comprising automatically starting the engine in response to an increase in a requested transmission input shaft torque.

13. The method of claim 10, further comprising opening a forward clutch of the transmission in response to the vehicle speed being within less than the threshold speed of zero vehicle speed.

14. The method of claim 13, further comprising closing the forward clutch in response to an increase in a desired transmission input shaft torque.

15. A vehicle system, comprising:
an engine;
a transmission including a torque converter, a torque converter lockup clutch, an accessory drive, and an accessory drive clutch positioned at or downstream of the torque converter and upstream of a transmission gear clutch; and
a controller including executable instructions stored in non-transitory memory to close the torque converter lockup clutch at zero vehicle speed in response to a request to drive vehicle accessories.

16. The vehicle system of claim 15, further comprising additional instructions to engage the transmission in neutral when a speed of a vehicle in which the engine resides is within a threshold speed of zero.

17. The vehicle system of claim 16, further comprising additional instructions to open the accessory drive clutch in response to a request to downshift the transmission.

18. The vehicle system of claim 17, further comprising additional instructions to adjust a torque capacity of the torque converter lockup clutch in response to a load on the accessory drive.

19. The vehicle system of claim 15, further comprising additional instructions to close the torque converter lockup clutch in response to a request to charge a battery via an alternator electrically coupled to the accessory drive.

* * * * *